United States Patent

[11] 3,587,432

[72] Inventor Carl Koch
  Schaffhausen, Switzerland
[21] Appl. No. 753,100
[22] Filed Aug. 16, 1968
[45] Patented June 28, 1971
[73] Assignee Sinar AG Schaffhausen
  Feuerthalen, Switzerland
[32] Priority Sept. 6, 1967
[33] Switzerland
[31] 12470/67

[54] PHOTOGRAPHIC CAMERA
  13 Claims, 8 Drawing Figs.
[52] U.S. Cl. ........................ 95/50, 95/49
[51] Int. Cl. ........................ G03b 5/06, G03b 5/08
[50] Field of Search ........................ 95/50, 51, 49; 355/52

[56] References Cited
  UNITED STATES PATENTS
  2,619,014 11/1952 Geddes ........................ 95/50

FOREIGN PATENTS
711,386 6/1954 Great Britain ........................ 95/50
1,046,474 12/1958 Germany ........................ 95/50
442,965 1/1968 Switzerland ........................ 95/50

Primary Examiner—John M. Horan
Assistant Examiner—Richard L. Moses
Attorney—Watson, Cole, Grindle and Watson ABSTRACT: A photographic camera having a base, a photosensitive material carrier and a lens carrier each adjustably coupled by means of holders in the camera base with both carriers coupled to a movable bearing member, the bearing members being movable for pivotal adjustment on the holders and the carriers are coupled to the respective bearing members by means of a rotary joint which defines a swing axis, and the bearing members are coupled to the associated holder for movement relative to the holder along respective arcuate bearing surfaces having centers of curvature lying on a common line which is on the side of the rotary joint remote from the camera base and defines a tilt axis.

INVENTOR.
Carl Koch

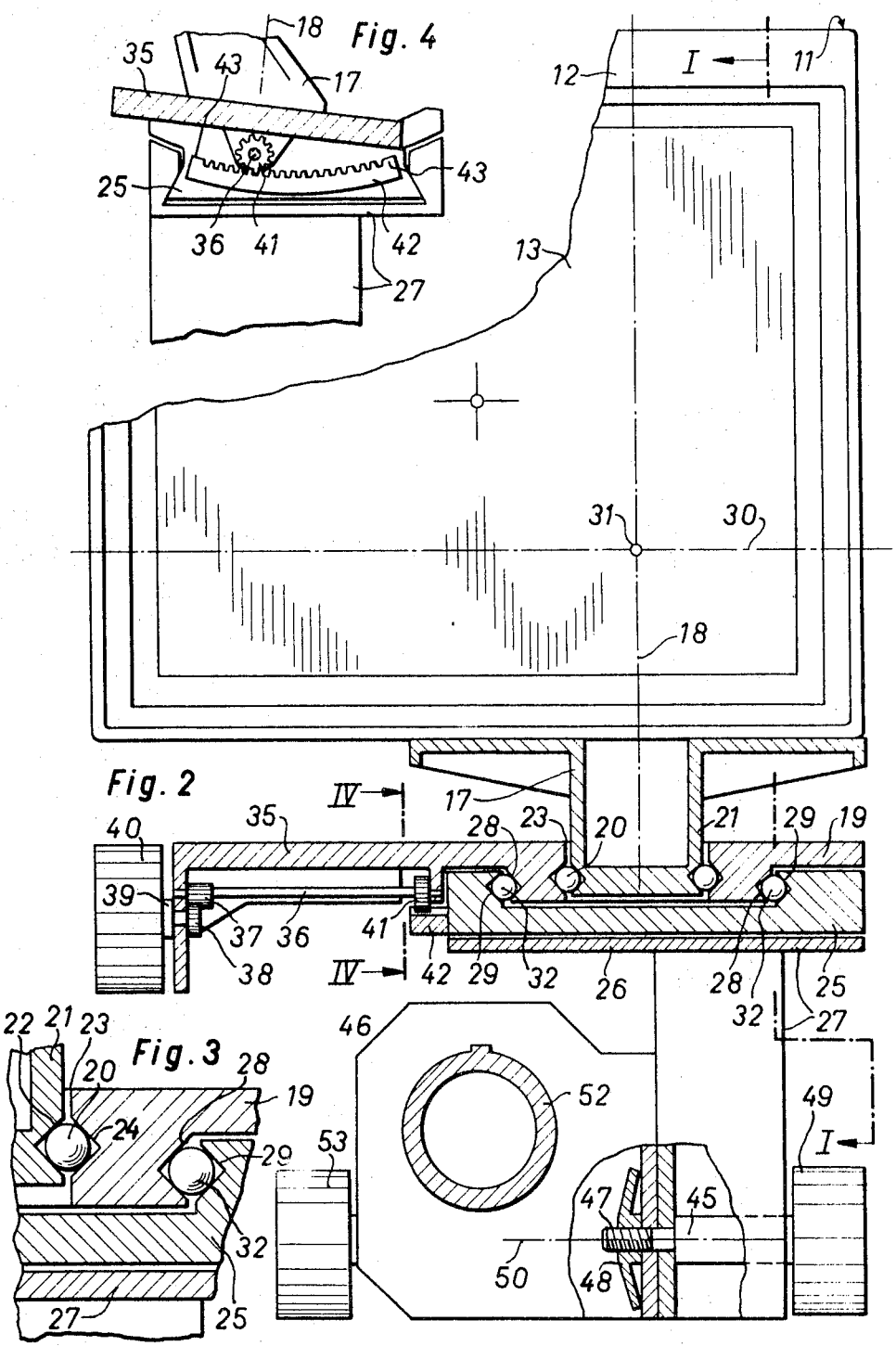

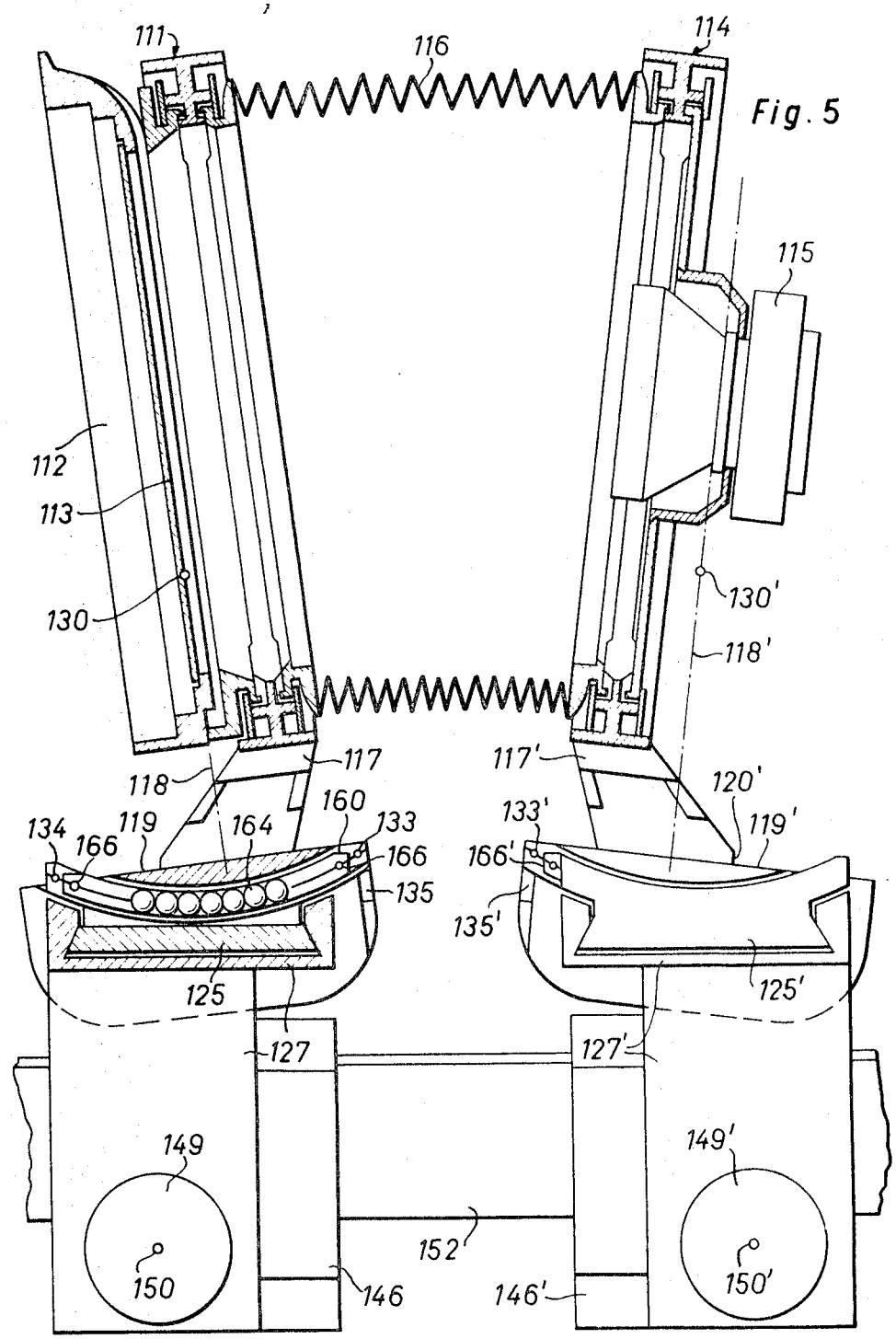

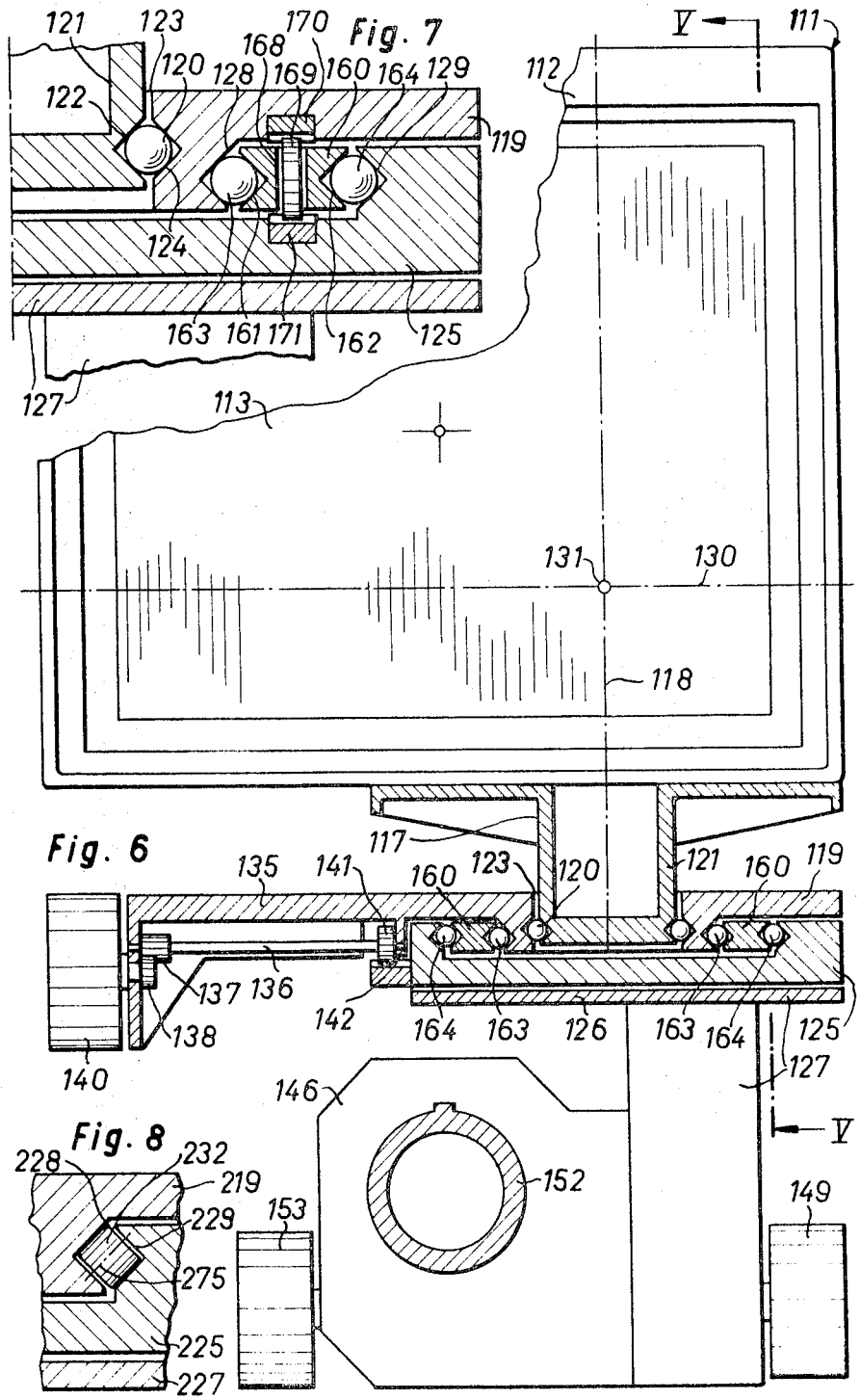

PHOTOGRAPHIC CAMERA

This invention relates to a photographic focusing screen camera comprising a carrier for photosensitive material and a lens carrier which are each adjustably connected to a camera base by means of respective holders, and wherein at least one of said carriers is pivotable in relation to the camera base about two pivot axes which intersect at right angles.

Cameras of the above-mentioned kind are known in various forms and are used particularly by expert photographers. In contrast to a camera in which the lens carrier and the carrier for the photosensitive material are not pivotable in relation to their connecting base, a camera of the kind described here will permit, for example, the simultaneous clear focusing of two or three object points lying at different distances from the camera and/or the adjustment of perspective distortions of the image, for example the correction of converging verticals which are images of upright edges of the object being photographed.

Two fundamentally different mechanical designs of pivotable lens carrier and photosensitive material carrier are known, namely those with so-called center pivoting and those with so-called base pivoting. In the case of center pivoting constructions, the two intersecting pivot axes pass as nearly as possible through the center of the focusing screen and of the lens of the camera, whereas in the case of base pivoting constructions, one of the two intersecting pivot axes is arranged close to the connecting base of the carrier and thus is located completely outside the boundary of the focusing screen or of the lens. The other of the two intersecting pivot axes in this second mentioned construction passes as nearly as possible through the center of the focusing screen and of the lens. Both known types of pivoting have advantages and disadvantages.

Center pivoting has, at least theoretically, the advantage that the draw or pullout of the camera, that is to say the distance between the centers of the focusing screen and of the lens, is only very slightly changed in response to a pivoting action. Consequently, an object point which is focused sharply in the center of the focusing screen will still remain sharply focused even after pivoting of the photosensitive material carrier or of the lens carrier. It is a disadvantage, however, that this advantageous feature is not obtained when the object to be photographed does not have a focusing point imaged in the center of the focusing screen. A further disadvantage is that when the photosensitive material carrier has been pivoted about a horizontal axis the film cassette can in many cases not be inserted broadside on, except if the photosensitive material carrier is subsequently displaced relative to the horizontal axis or if the photosensitive material carrier is pivotably mounted on a support with bent arms or backwardly displaceable hinges or on a one-armed support. These three latter measures however can impose limits upon a reduction of the draw or spacing of the camera, which makes the use of an extremely short-focus, wide-angle lens more complicated. The rearward displacement of the photosensitive material carrier relative to the horizontal pivot axis partially negatives the advantages of the center pivoting, since in the case of pivoting about this axis there occurs an upward or downward wandering of the image and a certain additional adjustment of the focusing is necessary.

As compared to center pivoting base pivoting has the advantage of permitting a large arc of pivotation of the photosensitive material carrier and of the lens carrier without broadside insertion of the film cassette being impeded in any pivoted position of the photosensitive material carrier, since the photosensitive material carrier is freely accessible from three sides. Furthermore, it is possible to construct the photosensitive material carrier and the lens carrier to be so flat, because of the depth displacement of the horizontal pivot axes, that they can be pushed very close together, which makes the use of an extremely short-focus lens possible without difficulties and without special accessories. On the other hand, it is a disadvantage with base pivoting that each pivotal movement about one of the horizontal axes causes a greater change of the camera draw or pullout than in the case of center pivoting, and, at the same time, the camera draw will be changed for each image point.

The majority of known constructions, both with center pivoting and also with base pivoting, are so constructed that, starting from the connecting base, the joints defining the vertical pivot axes for the photosensitive material carrier and the lens carrier are first set and thereafter the joints defining the horizontal pivot axes for the two carriers are then set. As a consequence, the relevant carrier, if it is already inclined to the associated horizontal pivot axis, undergoes a rolling movement having a lateral component in response to additional pivotation about the vertical pivot axis, with the result that the achievement of sharp focusing and of the desired image is made considerably more difficult. In order to avoid this disadvantage it is already known, in a camera with base pivoting, to position the joint defining the horizontal pivot axis of the lens carrier and/or of the photosensitive material carrier between the pivot joint defining the other pivot axis and the connecting base. This has the result that the support, at any angle of inclination to the horizontal pivot axis, remains parallel to the other pivot axis, whereby the above-mentioned rolling movement is avoided. This solution is, however, not easily adaptable to cameras with center pivoting or, in general, to cameras with horizontal pivot axes lying within the boundaries of the photosensitive material carrier and of the lens carrier. With such latter cameras a double mechanism for two horizontal pivot axes is needed, one of which axes passes approximately through the center of the lens carrier and the photosensitive material carrier and the other of which lies at the camera base. With reference to the central pivot axis the same disadvantages arise however as have already been mentioned above for center pivoting.

It is an object of the present invention to provide a focusing screen camera of the generic type first mentioned in which said rolling movement of the photosensitive material carrier or of the lens carrier is avoided, and in which in spite of the two carriers only one horizontal pivot axis is provided in the customary position of use of the camera, this horizontal pivot axis lying within the boundaries of the carriers and extending for example through their centers.

As in one of the known embodiments described above, in the camera in accordance with the present invention also, the photosensitive material carrier or the lens carrier is connected by means of a rotary joint which defines one of the two intersecting pivot axes with a movable member which is pivotably connected for its part to the associated holder secured to the camera base for pivotal movement about the second pivot axis. The novelty of the present invention lies in the fact that the movable member is a segmental bearing which is adjustably connected to the holder by means of bearing surfaces extending along circular arcs, said bearing surfaces having centers of curvature which lie on a common line which is on the side of the rotary joint remote from the connecting base and defines the second mentioned pivot axis. In this way, the bearing surfaces can be constructed as rolling tracks for rolling bodies, such as balls or cylindrical rollers, located between the opposing bearing surfaces of the holder and of the segmental bearing.

By means of the above-mentioned construction in accordance with the invention the second pivot axis, which in the usual camera construction is the horizontal axis, lies above the rotary joint, as does the other pivot axis, although the mechanical means which makes possible the pivotal movement about the second pivot axis lies beneath the rotary joint, i.e. between the joint and the connecting base. It is also possible by means of the invention to arrange for the two pivot axes to intersect within the periphery of the relevant photosensitive material carrier or lens carrier, either at the center of the carrier or at a certain distance therefrom. It is thus possible without difficulty to align the one pivot and the intersection point with the other pivot axis which is accurately in the image plane of the camera or in the central plane of the lens, so that upon pivotal movement no wandering of the image occurs and no degradation of the focusing on the pivot axis arises. The photosensitive material carrier in a camera in accordance with the invention can be freely accessible from three sides, i.e. from above, from the left, and from the right, so that the insertion of a film cassette carrying the photosensitive material is possible without difficulty in any pivoted position of the carrier from all three of said sides.

In a preferred embodiment of camera in accordance with the invention two intermediate members are provided between the segmental bearing and the holder, said intermediate members likewise having bearing surfaces extending along circular arcs with centers of curvature lying on the same common line. The intermediate members are movably guided on the one hand by the holder and on the other hand by the segmental bearing in the manner of a double rail. This construction provides a greater range of pivotation about the second-mentioned pivot axis for an equivalent length of curved bearing surface.

Further features and advantages of the camera in accordance with the present invention will become apparent from the following detailed description of certain embodiments thereof which are given by way of example and with reference to the accompanying drawings, in which:

FIG. 2 shows the camera of FIG. 1 in end elevation with a view of the focusing screen, certain parts of the camera being shown in vertical cross section;

FIG. 3 is a view on an enlarged scale of a part of FIG. 2;

FIG. 4 is a partial section taken along the line IV-IV of FIG. 2;

FIG. 5 shows a second embodiment of camera in accordance with the invention, partly in side elevation and partly in vertical longitudinal section along the line V-V of FIG. 6;

FIG. 6 shows the camera of FIG. 5 in rear elevation with a view of the focusing screen, certain parts of the camera being shown in vertical cross section;

FIG. 7 is a view on an enlarged scale of a part of FIG. 6; and,

FIG. 8 is view similar to FIG. 3 but of a further modification.

Figure 1:
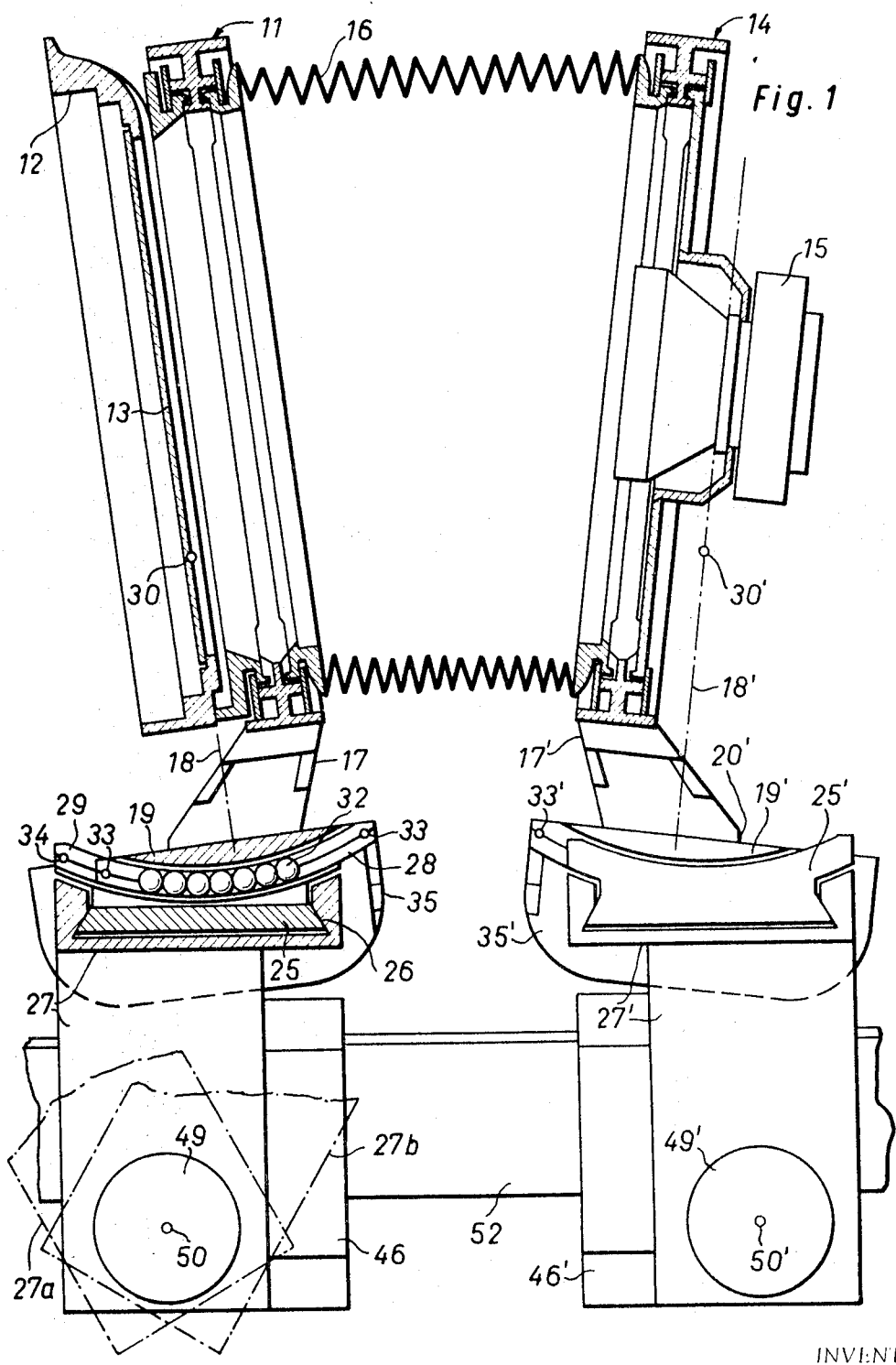
FIG. 1 shows a first embodiment of camera in accordance with the invention, partly in side elevation and partly in vertical longitudinal section along the line I-I of FIG. 2.

The embodiment of photographic focusing screen cassette-loading camera shown in FIGS. 1 to 4 of the drawings in accordance with the present invention comprises a photosensitive material carrier 11 at its rearward end, the carrier being provided with a focusing screen 13 built into a frame 12. In known manner, which is therefore not illustrated, the cassette or other magazine of photosensitive photographic material can be attached to the carrier 11, either by first removing the focusing screen 13 by means of its frame 12 or by inserting the cassette between the carrier 11 and the focusing screen frame 12, in which latter case the focusing screen frame 12 is simply pushed back against the action of retaining springs (not shown). At its forward end the camera includes a lens carrier 14 provided with an objective lens 15 which is so mounted as to provide on the focusing screen 13 an image of an object to be photographed. The photosensitive material carrier 11 and the lens carrier 14 are connected to each other by a light-tight folding cover or bellows 16.

The photosensitive material carrier 11 is secured on a support 17 which is mounted on a segmental bearing 19 for rotation about an axis 18, this rotatable mounting being aided by a rotary joint comprising a plurality of balls 20, (FIGS. 2 and 3). The support 17 includes a lower peg-shaped end portion 21 which projects into a hole 23 in the segmental bearing 19 and is provided with a peripheral groove 22. In the surface of the hole 23 in the segmental bearing 19 is provided a second peripheral groove 24 facing the groove 22 in the support and aligned therewith. The balls 20 are positioned in the space defined between the two grooves 22 and 24. The axis 18 is a first pivot axis of the photosensitive material carrier 11 and lies precisely in the image plane of the camera, i.e. in the plane of the front surface of the focusing screen 13 when the screen lies in its normal position for the focusing of images thereon.

The segmental bearing 19 is movably supported on a saddle 25 which is adjustably mounted for its part in a guide slot 26 in a swivel post 27 and can be locked in position by means of a clamping device (not shown). The segmental bearing 19 and saddle 25 each have two grooves 29 and 29 respectively of V-shaped cross section formed therein (FIGS. 2 and 3), these grooves extending along arcs of circles centered on an axis 30. This axis 30 intersects the first-mentioned axis 18 at right angles at a position 31 which lies precisely in the image plane of the camera, i.e. on the front surface of the focusing screen 13. Preferably, the two axes 18 and 30 are marked on the focusing screen 13 by visible lines. The V-shaped grooves 28 and 29 are open in a direction parallel to the axis 30 and are arranged to oppose each other in pairs so that each groove 28 in the segmental bearing 19 faces a corresponding groove 29 in the saddle 25, as clearly shown in FIGS. 2 and 3. Each pair of facing grooves 28 and 29 defines a hollow space in which a row of balls 32 is positioned. The V-surfaces of the grooves 28 and 29 form bearing surfaces for the balls 32 and have centers of curvature which all lie on the above-mentioned axis 30. In order to prevent the balls 32 from falling out of the ends of the grooves 28 and 29 small stop pins 33 and 34 are set into the ends of the grooves, as can be seen from FIG. 1.

By means of the arcuate grooves 28 and 29 and by means of the balls 32 the segmental bearing 19 is displaceably movable relative to the saddle 25 in such manner that a displacement movement of the segmental bearing 19 causes a pivoting movement of the photosensitive material carrier 11 about the axis 30, this axis 30 consequently constituting a second pivot axis of the photosensitive material carrier. It should be noted that this second pivot axis 30 extends within the boundaries of the photosensitive material carrier 11, although the mechanical means 19, 25, 28, 29 and 32 which make this pivotal movement possible are positioned externally of the photosensitive material carrier 11 and indeed are positioned on the side of the rotary joint 20 remote from the pivot axis 30. During the movement of the segmental bearing 19 the balls 32 roll on the bearing surfaces of the grooves 28 and 29 along the longitudinal direction of these grooves, with the result that only comparatively small frictional forces need to be overcome.

In order to carry out this pivotal movement of the photosensitive material carrier 11 about the second pivot axis 30 the following control mechanism is provided. The segmental bearing 19 includes at one side an extension 35, on the underside of which, as shown in FIGS. 2 and 4, a shaft 36 is rotatably mounted extending parallel to the axis 30. One end of the shaft 36 carries a pinion 37 (FIG. 2) secured against rotation on the shaft and meshing with a further gear wheel 38. This latter gear wheel 38 is secured on a shaft 39 which is likewise rotatably mounted on the extension 35 and carries an adjustment knob 40 which is arranged for manual operation. The other end of the shaft 36 carries a second pinion 41 secured against rotation on the shaft and which meshes with a toothed rack 42. The rack 42 is secured to the saddle 25 and extends in a circular arc centered on the axis 30 as shown in FIG. 4. By rotation of the adjustment knob 40 the shaft 36 can be rotated via the gears 37 and 38, with the result that the pinion 41 is driven and travels along the rack 42. Consequently, the shaft 36 is displaced parallel to itself since the rack 42 is stationary, with the result that the segmental bearing 19 is also moved and the photosensitive material carrier 11 is pivoted about the pivot axis 30. In order to limit the range of pivotal movement of the photosensitive material carrier 11 the two ends 43 of the rack 42 have no teeth so that excessive movement of the pinion 41 along the rack is thereby prevented.

A further rotatable knob is also mounted on the extension 35 of the segmental bearing 19 although it is not shown in the drawings. This further knob is positioned next to the adjustment knob 40 and in FIG. 2 would lie in front of or behind the adjustment knob. This additional knob serves to control a setting mechanism, also not shown, for example comprising worm gearing, for rotating the support 17 about the axis 18.

The swivel post 27 is pivotably and adjustably connected to a displaceable crosshead 46 by means of a bolt 45, (FIG. 2).

The bolt 45 includes an extension 47 which is threaded and which projects into a hollow chamber in the crosshead 46 and carries a platelike nut 48. The other end of the bolt 45 carries a rotatable knob 49 which is arranged for manual operation and by means of which the bolt 45 can be rotated in order to screw the threaded portion 47 of the bolt to a greater or lesser extent into the nut 48. If the screw connection between the threaded portion 47 and the nut 48 is loosened to some degree, then the swivel post 27 and the components mounted thereon can be pivoted relative to the crosshead 46 within certain limits, as is indicated in FIG. 1 by chain-dotted lines for two positions 27a and 27b. The consequential pivotal movement takes place about an axis 50 which extends parallel to the axis 30 of the photosensitive material carrier 11. By tightening the screw connection between the threaded portion 47 of the bolt 45 and the nut 48, the swivel post 27 can be locked in any chosen position relative to the crosshead 46.

The crosshead 46 is mounted on a camera base 52 formed as an optical bench and is displaceable along the base. A clamping device, which is not shown in the drawings, together with a rotatable knob 53 which serves as a control member, makes it possible to lock the crosshead 46 in any desired position relative to the camera base 52. The saddle 25, the swivel post 27, and the crosshead 46 together form a holder by means of which, through the intermediate connection of the supports 17 and the segmental bearing 19, the photosensitive material carrier 11 is adjustably coupled to the camera base 52. The construction of the holder 25, 27, 46 and the arrangement of the segmental bearing 19 are such that the second pivot axis 30 of the photosensitive material carrier constantly lies at an angle of 90° to the longitudinal direction of the camera base 52.

The lens carrier 14 is coupled to the camera base 52 in the same manner as the photosensitive material carrier 11, and the same or mirror-image components are provided therefor, these components being shown in FIG. 1 with the same reference numerals but with the addition of indices as the references for the corresponding components for the support and mounting of the photosensitive material carrier 11. Thus, the lens carrier 14 is also pivotably connected to a multipart holder 25', 27', 46' by means of a rotary joint (not shown) for pivotal movement about a first axis 18' and by means of a segmental bearing 19' for pivotal movement about a second axis 30'. The holder is likewise adjustable along the camera base 52. The two pivot axes 18' and 30' intersect at right angles, the first pivot axis 18' always lying in a plane perpendicular to the optical axis of the lens 15, this plane passing at least approximately through the center of the lens and consequently being referred to as the central plane of the lens. The second pivot axis 30' permanently extends at an angle of 90° to the longitudinal direction of the camera base 52. If desired, one can tilt the swivel post 27' forwards or backwards relative to the crosshead 46' by operation of the rotatable knob 41' and then lock it in the chosen position.

In the illustrated normal position of use of the camera, i.e. with the camera base 52 beneath the camera, the pivot axes 30 and 30' have a horizontal attitude while the other pivot axes 18 and 18' extend in a common vertical plane. It would constructionally be possible to arrange that the intersection point 31 of the two pivot axes 18 and 30 of the photosensitive material carrier 11 should lie in the center of the focusing screen 13 and that the intersection point of the two pivot axes 18' and 30' of the lens carrier 14 should lie at the center of the lens 15, as is the case in a normal camera with center pivoting. In the embodiment which is here illustrated and described however the camera is not so constructed. It is known that the simultaneous sharp focusing of two or even three image points which are images of object points at differing distances from the camera objective lens 15 can be more easily accomplished in the majority of practical cases if the intersecting pivot axes lie within the boundaries of the photosensitive material carrier 11 and of the lens carrier 14 but do not actually pass through the centers of the respective carriers. It is particularly advantageous if the horizontal pivot axes 30 and 30' lie between the centers of the respective carriers 11 and 14 and the lower edges of the carriers 11 and 14 which are closest to the base 52 of the camera, and if the other pivot axes 18 and 18' are positioned between the centers of the carriers and one, usually vertical, edge of the respective carriers 11 and 14, as is shown in FIGS. 1 and 2.

The foregoing description and particularly FIG. 2 of the drawings make it quite clear that the photosensitive material carrier 11 and the focusing screen frame 12 are quite freely accessible not only from above but also from the left-hand side and the right-hand side, no matter how much the photosensitive material carrier 11 is tilted backwards or forwards about the horizontal pivot axis 30. Consequently, the insertion of the cassette is in no way hindered whether this is effected from above or from either side, even though the camera is not one with base pivoting. This is one of the most important advantages of the camera in accordance with the invention.

If the photosensitive material carrier 11 is tilted from the vertical about the horizontal pivot axis 30 and/or the axis 50, the other pivot axis 18 automatically assumes the same position of inclination, i.e. it remains always exactly in the image plane of the camera. In the event of a subsequent pivotal movement of the photosensitive material carrier 11 about said other pivot axis 18 the carrier therefore undergoes no rolling movement, and the intersection point 31 of the axes 18 and 30 remains unmoved. The same considerations also apply to the lens carrier 14 if it is first tilted about the horizontal pivot axis 30' and/or the axis 50' and is subsequently pivoted laterally about its other pivot axis 18'. The focusing of the image on the focusing screen 13 is therefore comparatively simple and convenient, even if three object points which lie at differing distances from the lens carrier are required to be simultaneously focused sharply on the screen. It should be mentioned that a pivotal movement of the swivel posts 27 and 27' about the corresponding axes 50 and 50' is only used if the range of pivotal movement of the segmental bearings 19 and 19' is not sufficient. In such a case one uses the pivotal facility of the swivel posts 27 and 27' only to obtain an approximate tilt setting for the photosensitive material carrier 11 and for the lens carrier 14. For an exact fine adjustment pivotal movement about the axes 30 an 30' is carried out exclusively by means of the segmental bearings 19 and 19'.

In order to achieve sharp focusing of three different image points which are images of object points at differing distances from the camera, one of these image points is preferably first aligned with the intersection points 31 of the pivot axes 18 and 30 and is focused on the focusing screen 13, for which step one suitably adjusts the spacing of the two crossheads 46 and 46' from each other. Next, by pivoting the photosensitive material carrier 11 and/or the lens carrier 14 about the associated pivot axes 18 and 30 or 18' and 30' one can carry out the sharp focusing of the two other image points without thereby causing the focusing screen image to wander or the focus of the image of the first object point to be lost or affected to any noticeable extent. Preferably, the image of the second object point should like approximately on the pivot axis 18. For the sharp focusing of this image the photosensitive material carrier need then only be tilted about the horizontal pivot axis 30 or the lens carrier be tilted about the pivot axis 30'. Finally, the focusing of the image of the third object point can then be carried out by simple pivotal movement of the photosensitive material carrier 11 about the pivotal axis 18 and/or of the lens carrier 14 about the pivot axis 18', while the already focused images of the first and second object points are in no way or are only very slightly changed and the focusing screen images do not wander. This is a very significant advantage in the swift and convenient operation of the camera which would not be achieved if, starting from the camera base 52, first the rotatable joints with the pivot axes 18 and 18' are set and then the pivot devices with the pivot axes 30 and 30' are set, as is always the case in the known constructions of camera with center pivoting.

The second embodiment of camera in accordance with the invention which is illustrated in FIGS. 5 to 7 is largely the same as the embodiment of camera just described; thus, for the indication of corresponding or analogous components or parts the same reference numerals are used in this second embodiment as in the first embodiment but increased by 100. For example, corresponding to the photosensitive material carrier 11 of the first embodiment the carrier of the second embodiment is indicated by the numeral 111; the pivot axis 118' of the second embodiment corresponds to the pivot axis 18' of the first embodiment, etc. In the following description only the features of difference in the second embodiment as compared with the first embodiment will be discussed.

In order to increase the range of pivotal movement of the photosensitive material carrier 111 about the horizontal pivot axis 130 two intermediate members 160 are inserted between the V-shaped grooves 128 of the segmental bearing 119 and the grooves 129 of the saddle 125 of the holder 125, 127, 146. These intermediate members 160 are movably guided on their one side by the segmental bearing 119 and on their other side by the saddle 125 in the manner of a drawer supported on each side by a runner. Each intermediate member 160 is provided with two grooves 161 and 162 of V-shaped cross section, which, like grooves 128 and 129, extend along circular arcs centered on the axis 130. The flanking surfaces of the grooves 161 and 162 similarly have axes of curvature which all lie on the common axis 130. The grooves 161 and 162 are open in opposing directions parallel to the axis 130 and respectively face the grooves 128 on the segmental bearing 119 and the grooves 129 in the saddle 125, as can be seen most clearly in FIG. 7. A first row of balls 163 is in engagement with the pair of grooves 128 and 161, while a second row of balls 164 is in engagement with the other pair of grooves 129 and 162, the flanking surfaces of the grooves acting as bearing and rolling surfaces for the balls. In order to prevent the balls 163 and 164 from falling out of the ends of the grooves small stop pins 133, 134 and 166 are inserted in the ends of the grooves, as can be seen in FIG. 5.

As shown in FIG. 7 each intermediate member 160 which acts as a double-sided runner is provided in its center portion with a slot 168 passing therethrough in which a small gear wheel 169 rests loosely. Mounting of the gear wheel 169 on a shaft is unnecessary. The gear wheel 169 is in engagement with two racks 170 and 171 which are fixedly inset into suitable grooves in the segmental bearing 119 and in the saddle 125. The gear racks 170 and 171 are each of arcuate shape centered on the axis 130. In FIG. 6 the gear wheels 169 associated with each of the two intermediate members 160 and the associated gear racks 170 and 171 are not shown in order to provide a clearer overall view of the construction.

If the segmental bearing 119 is moved by operation of the rotatable knob 140 in order to pivot the photosensitive material carrier 111 about the axis 130, each of the intermediate members 160 is so driven by means of the gear wheels 169, mounted in the slot 168 that each intermediate member 160 travels precisely half the curved path of the segmental bearing 119. Since the intermediate members 160 can have a range of movement of approximately the same size as the segmental bearing 19 of the first embodiment the range of movement of the segmental bearing 119 in this second embodiment is approximately doubled as compared with the first embodiment.

The pivotal range of the segmental bearing 119 when increased in this way makes it unnecessary in many cases to pivot the swivel post 127 of the holder 125, 127, 146 about the axis 150. For this reason, in a simplified embodiment of camera, the swivel post 127 can be permanently fixedly connected to the crosshead 146. The above-mentioned differences in relation to the first embodiment apply in the same way to the lens carrier 114.

In a simplified but nevertheless useful modified construction the gear wheels 169 and gear racks 170 and 171 for positive driving of the intermediate members 160 can be omitted.

In FIG. 8 a modified form of the first embodiment is shown in which, instead of the balls 32, bodies 232 in the form of cylindrical rollers are provided. These rollers 232 are positioned in the hollow space which is formed by the V-shaped grooves 228 and 229 of the segmental bearing 219 and of the saddle 225. The rotational axes 275 of consecutive adjacent rollers 232 are alternately shifted relative to one another by an angle which corresponds to the apex angle of the grooves 228 and 229. In the illustrated embodiment the two flanking surfaces of the V-shaped grooves 228 and 229 meet at an angle of 90°, with the result that the axes 275 of alternate rollers 232 are displaced through 90° relative to one another. This embodiment has the advantage that smaller surface pressures are exerted between the flanking surfaces of the grooves 228 and 229 on the one hand and the cylindrical rollers 232 on the other hand than in the case of the balls 32 of the first embodiment. The rollers 232 are preferably manufactured from a polymeric synthetic plastics material.

Naturally, in an analogous manner, it is also possible to replace the balls 163 and 164 of the second embodiment by cylindrical rollers whose axes of rotation are alternately offset by 90° relative to one another.

In the preceding description and in the drawings, for the sake of greater simplicity and improved layout, the additional means which make possible the displacement of the photosensitive material carrier and/or the lens carrier about the pivot axes 18, 18' and 118, 118' as well as the fine adjustment of a part of the crossheads 46, 46' and 146, 146' in relation to the longitudinal direction of the camera base 52 or 152 are omitted. If desired, such means can additionally be provided as in a universal camera of normal construction.

An additional advantage achieved by the present invention is that the overall depth of the camera can be maintained comparatively small, since lateral joints at the level of the horizontal pivot axes 30, 30' and 130, 130' are not required, in contrast to the known camera constructions with center pivoting in which the above-mentioned joints and associated setting devices must be provided laterally adjacent to the photosensitive material carrier and/or the lens carrier.

In a further variation of the described embodiments of camera in accordance with the present invention, which variation is not shown in the drawings however, instead of the balls 32, 163 and 164 or rollers 232 runners of low friction material such as nylon for example can be provided in the pairs of grooves 28, 29; 128, 129; 161, 162; and 228, 229. These runners are preferably secured against displacement in one of the grooves of the respective groove pairs and are slidable in the other groove of the pair. Moreover, other forms of sliding bearing may also be used.

I claim:

1. A photographic focusing screen camera comprising a photosensitive material carrier and a lens carrier which are each adjustably coupled by means of respective holders to a camera base, wherein at least one of said carriers is pivotable relative to the camera base about two swing and tilt axes intersecting at right angles, a movable segmental bearing member, at least one carrier is coupled to the movable segmental bearing member by means of a rotary joint which defines the swing axis, said segmental bearing member being coupled to the associated holder for pivotal movement about the tilt axis, said tilt axis extending permanently at an angle of 90° to the longitudinal axis of the camera base, and said segmental bearing member being coupled to the associated holder for movement relative to the holder along respective arcuate bearing surfaces having centers of curvature which lie on a common line which is on the side of the rotary joint remote from the camera base and defines said tilt axis.

2. A camera in accordance with claim 1, wherein said bearing surfaces are rolling tracks for bodies of rotation which are positioned between mutually opposing bearing surfaces of the segmental bearing member and of the holder.

3. A camera in accordance with claim 2, wherein the bearing surfaces define V-shaped grooves which are open in a direction parallel to the common line of the centers of curvature and which are arranged in mutually opposed pairs, said bodies of rotation being mounted in each such pair of grooves.

4. A camera in accordance with claim 1, wherein an intermediate member is provided between the bearing surfaces of the segmental bearing member and of the holder, said intermediate member providing a pair of bearing surfaces also of arcuate form with centers of curvature lying on said common line, and being suspended between the holder on the hand and the segmental bearing member on the other hand.

5. A camera in accordance with claim 4, wherein the bearing surfaces of the segmental bearing member, the holder, and the intermediate member are rolling tracks for bodies of rotation which are positioned between the mutually opposing bearing surfaces of the segmental bearing member and of the intermediate member on the one hand and of the holder and of the intermediate member on the other hand.

6. A camera in accordance with claim 5, wherein the bearing surfaces define V-shaped grooves which are open in a direction parallel to the common line of the centers of curvature and which are arranged in mutually opposed pairs, and wherein the bodies of rotation are mounted in each such pair of grooves between the segmental bearing member and the intermediate member and between the holder and the intermediate member.

7. A camera in accordance with claim 3, wherein said bodies of rotation are cylindrical rollers having axes of rotation which in each groove pair are alternately displaced relative to one another by an angle which corresponds to the apex angle between the flanking surfaces of the V-shaped grooves.

8. A camera in accordance with claim 1, wherein a gear rack and pinion mechanism is provided for effecting movement of the segmental bearing member, either said rack or said pinion being mounted on the holder and the other being mounted on the segmental bearing member, wherein the rack extends along an arc centered on said tilt axis, and wherein the pinion is rotatably mounted by means of a shaft which is positively connected to a control member.

9. A camera in accordance with claim 1, wherein each holder comprises at least two relatively movable and lockable parts, one of said parts being pivotable relative to the camera base about a further axis which extends parallel to said tilt axis.

10. A camera in accordance with claim 1, wherein for each carrier said common line defining said tilt axis lies between the center of the carrier and the edge of the carrier nearest to the camera base.

11. A camera in accordance with claim 1, wherein the photosensitive material carrier is pivotable relative to the camera base, wherein said swing axis defined by the associated rotary joint lies permanently in the image plane of this carrier, and wherein said tilt axis passes through a point on said one axis.

12. A camera in accordance with claim 1, wherein the lens carrier is pivotable relative to the camera base, wherein said pivot axis defined by the associated rotary joint lies permanently in the central plane of the lens, and wherein said tilt axis passes through a point on said swing axis.

13. A camera according to claim 5, in which the bearing surfaces define V-shaped grooves which are open in a direction parallel to the common line of the centers of curvature and which are arranged in mutually opposed pairs, and wherein the bodies of rotation are mounted in each such pair of grooves between the segmental bearing member and the intermediate member and between the holder and the intermediate member, said bodies of rotation being cylindrical rollers having axes of rotation which in each groove pair are alternately displaced relative to one another by an angle which corresponds to the apex angle between the flanking surfaces of the V-shaped grooves.